US012610133B2

(12) United States Patent
Zhang et al.

(10) Patent No.: US 12,610,133 B2
(45) Date of Patent: Apr. 21, 2026

(54) PHOTOGRAPHING INTERFACE DISPLAY METHOD AND APPARATUS, ELECTRONIC DEVICE, AND MEDIUM

(71) Applicant: VIVO MOBILE COMMUNICATION CO., LTD., Chang'an Dongguan (CN)

(72) Inventors: Hainan Zhang, Chang'an Dongguan (CN); Yuqing Liu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 233 days.

(21) Appl. No.: 18/477,902

(22) Filed: Sep. 29, 2023

(65) Prior Publication Data

US 2024/0031668 A1 Jan. 25, 2024

Related U.S. Application Data

(63) Continuation of application No. PCT/CN2022/083451, filed on Mar. 28, 2022.

(30) Foreign Application Priority Data

Mar. 31, 2021 (CN) .......................... 202110351574.3

(51) Int. Cl.
 *H04N 23/63* (2023.01)
(52) U.S. Cl.
 CPC ......... *H04N 23/632* (2023.01); *H04N 23/635* (2023.01)

(58) Field of Classification Search
 CPC .... H04N 23/632; H04N 23/635; H04N 23/62; H04N 23/667; H04N 23/68; G06F 3/0482; G06F 3/0484; G06F 16/54
 See application file for complete search history.

(56) References Cited

U.S. PATENT DOCUMENTS

| | | | |
|---|---|---|---|
| 2006/0146167 A1 | 7/2006 | Aizawa et al. | |
| 2011/0058087 A1* | 3/2011 | Ito ........................ | H04N 23/667 348/E5.022 |
| 2017/0345392 A1 | 11/2017 | Matsubayashi | |

(Continued)

FOREIGN PATENT DOCUMENTS

| | | |
|---|---|---|
| CN | 103458190 A | 12/2013 |
| CN | 104735259 A | 6/2015 |
| CN | 104767941 A | 7/2015 |

(Continued)

*Primary Examiner* — Christopher K Peterson
(74) *Attorney, Agent, or Firm* — Price Heneveld LLP

(57) ABSTRACT

This application discloses a photographing interface display method and apparatus, an electronic device, and a medium. The method includes: receiving a first input performed by a user on a first interface, where the first interface includes at least one thumbnail, and each thumbnail indicates one image; displaying N mode identifiers in response to the first input, where each mode identifier is used to indicate a photographing mode of at least one image, and N is a positive integer; receiving a second input performed by a user on a target mode identifier in the N mode identifiers; and displaying a photographing preview interface of a target photographing mode in response to the second input, where the target photographing mode is a photographing mode indicated by the target mode identifier.

20 Claims, 14 Drawing Sheets

(56) References Cited

U.S. PATENT DOCUMENTS

| | | |
|---|---|---|
| 2018/0063431 A1 | 3/2018 | Cho et al. |
| 2022/0084299 A1 | 3/2022 | Han et al. |

FOREIGN PATENT DOCUMENTS

| | | |
|---|---|---|
| CN | 110891144 A | 3/2020 |
| CN | 113093968 A | 7/2021 |
| JP | 2011054075 A | 3/2011 |
| JP | 2017228844 A | 12/2017 |
| KR | 20060080525 A | 7/2006 |
| KR | 20140082913 A | 7/2014 |
| KR | 20200137594 A | 12/2020 |

* cited by examiner

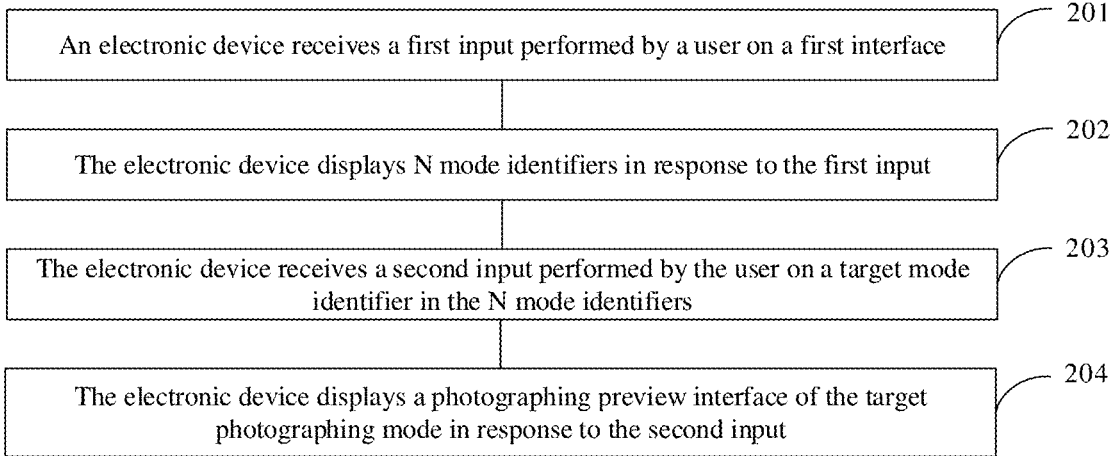

An electronic device receives a first input performed by a user on a first interface        201

The electronic device displays N mode identifiers in response to the first input        202

The electronic device receives a second input performed by the user on a target mode identifier in the N mode identifiers        203

The electronic device displays a photographing preview interface of the target photographing mode in response to the second input        204

FIG. 1

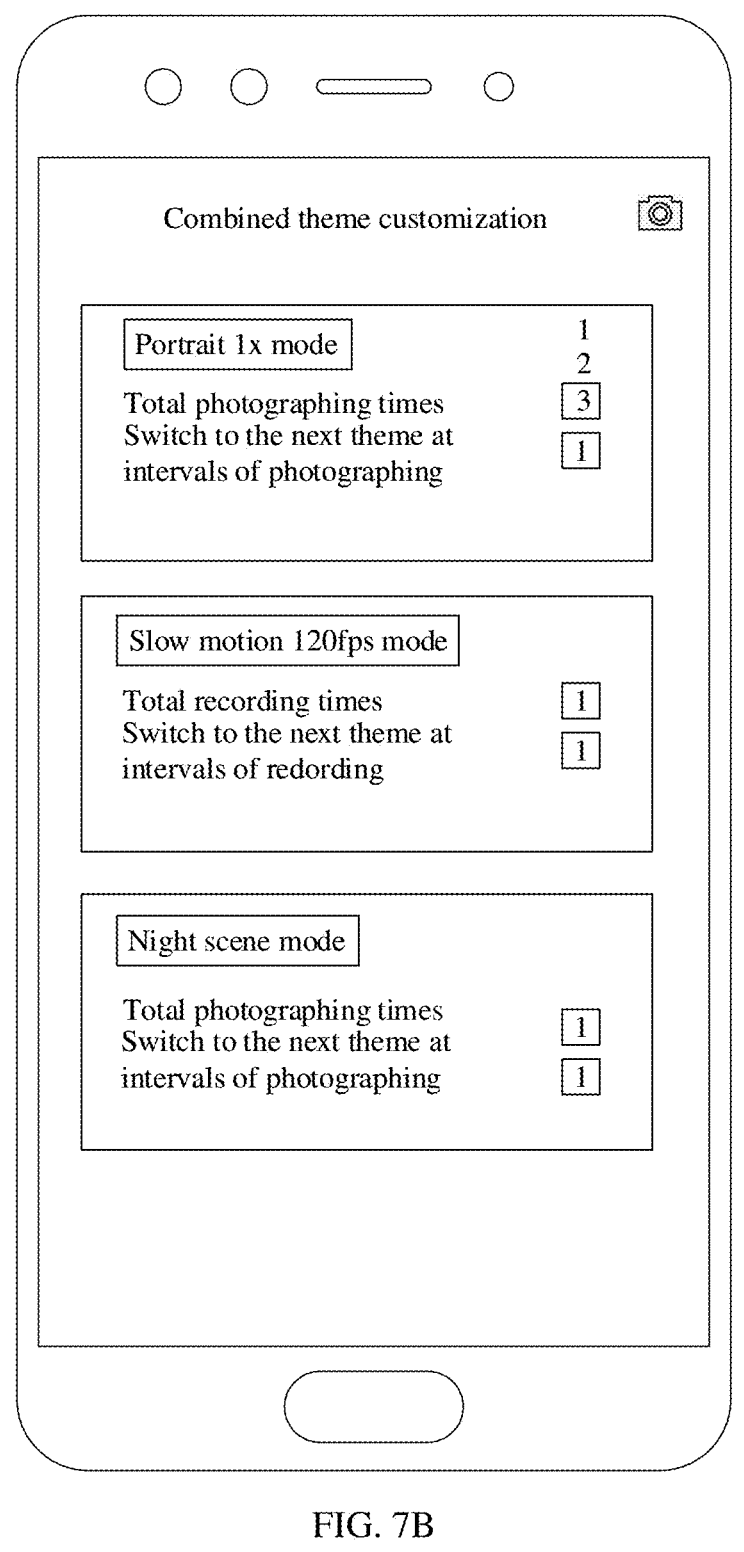

Combined theme customization 📷

Portrait 1x mode
1
2
Total photographing times    3
Switch to the next theme at    1
intervals of photographing Slow motion 120fps mode Total recording times    1
Switch to the next theme at    1
intervals of redording Night scene mode Total photographing times    1
Switch to the next theme at    1
intervals of photographing

FIG. 7B

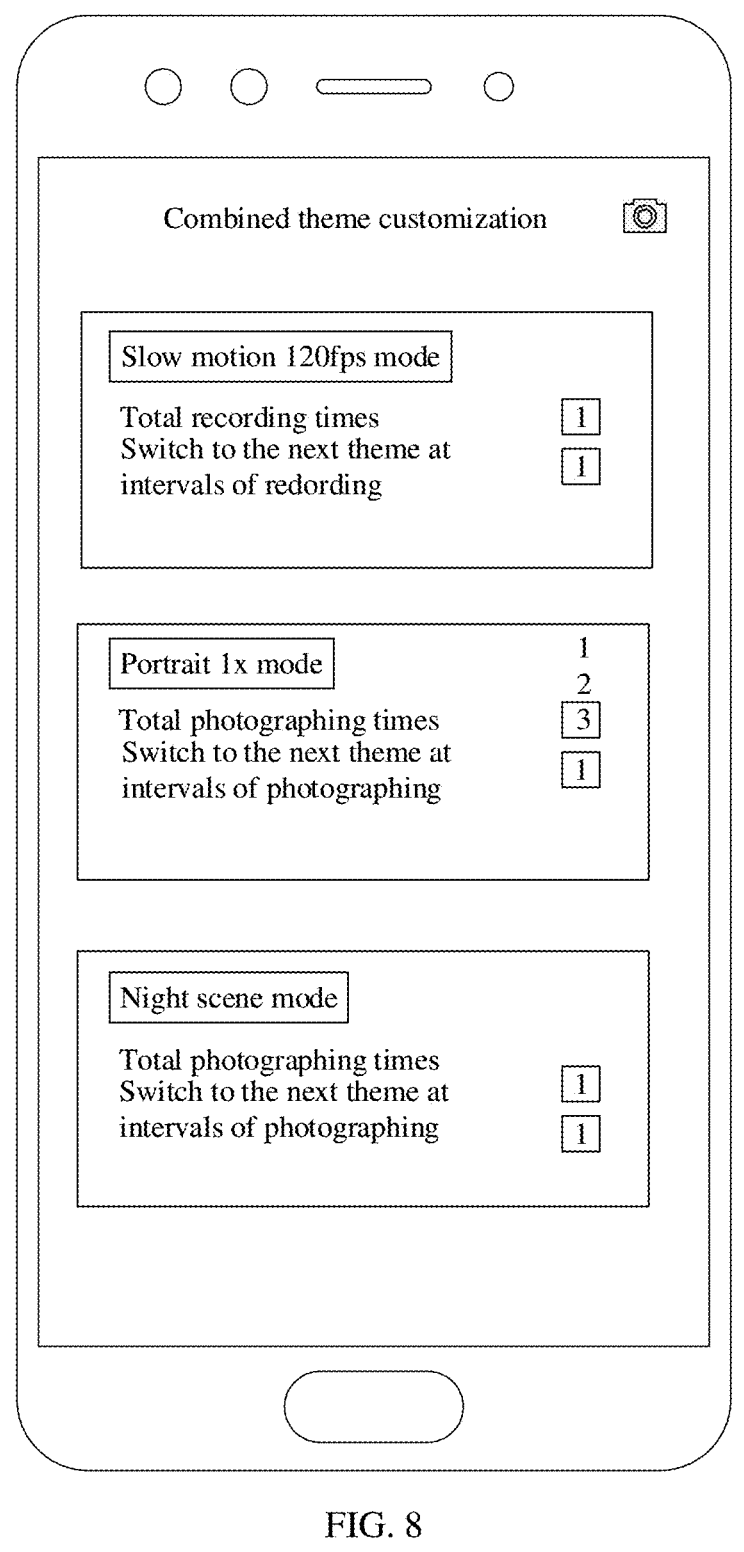

Combined theme customization 📷

Slow motion 120fps mode

Total recording times                1
Switch to the next theme at          1
intervals of redording Portrait 1x mode                     1
                                     2
Total photographing times            3
Switch to the next theme at          1
intervals of photographing Night scene mode Total photographing times            1
Switch to the next theme at          1
intervals of photographing

FIG. 8

PHOTOGRAPHING INTERFACE DISPLAY METHOD AND APPARATUS, ELECTRONIC DEVICE, AND MEDIUM

CROSS-REFERENCE TO RELATED APPLICATIONS

The present application is a continuation application of International Application No. PCT/CN2022/083451 filed on Mar. 28, 2022, which claims priority of Chinese Patent Application No. 202110351574.3, filed with the China National Intellectual Property Administration on Wednesday, Mar. 31, 2021, and entitled "PHOTOGRAPHING INTERFACE DISPLAY METHOD AND APPARATUS, ELECTRONIC DEVICE, AND MEDIUM", both of which are incorporated herein by reference in their entireties.

TECHNICAL FIELD

This application pertains to the field of photographing technologies, and specifically relates to a photographing interface display method and apparatus, an electronic device, and a medium.

BACKGROUND

Generally, when taking photos by using an electronic device, a user may use photographing modes such as a portrait mode, a background blurring mode, a panoramic mode, and a night scene mode of a camera application to photograph images according to different requirements. In addition, the electronic device may classify the images photographed in different photographing modes, to save the images in different folders, so that the user can quickly find an image that needs to be viewed in an album application.

However, when the user views an image in the album application, if the user needs to perform image photographing in a photographing mode corresponding to the image, the user needs to first exit the album application, open the camera application, and then select a required photographing mode in the camera application. Therefore, operations of the user are cumbersome and time-consuming, and consequently photographing efficiency of the electronic device is low.

SUMMARY

Embodiments of this application aim to provide a photographing interface display method and apparatus, an electronic device, and a medium, to resolve a problem of low photographing efficiency.

To resolve the foregoing technical problem, this application is implemented as follows:

According to a first aspect, an embodiment of this application provides a photographing interface display method. The photographing interface display method includes: receiving a first input performed by a user on a first interface, where the first interface includes at least one thumbnail, and each thumbnail indicates one image; displaying N mode identifiers in response to the first input, where each mode identifier is used to indicate a photographing mode of at least one image, and N is a positive integer; receiving a second input performed by a user on a target mode identifier in the N mode identifiers; and displaying a photographing preview interface of a target photographing mode in response to the second input, where the target photographing mode is a photographing mode indicated by the target mode identifier.

According to a second aspect, an embodiment of this application provides a photographing interface display apparatus. The photographing interface display apparatus includes a receiving module and a display module. The receiving module is configured to receive a first input performed by a user on a first interface, where the first interface includes at least one thumbnail, and each thumbnail is used to indicate one image. The display module is configured to display N mode identifiers in response to the first input received by the receiving module, where each mode identifier is used to indicate a photographing mode of at least one image, and N is a positive integer. The receiving module is further configured to receive a second input performed by a user on a target mode identifier in the N mode identifiers. The display module is further configured to display a photographing preview interface of a target photographing mode in response to the second input received by the receiving module, where the target photographing mode is a photographing mode indicated by the target mode identifier.

According to a third aspect, an embodiment of this application provides an electronic device. The electronic device includes a processor, a memory, and a program or an instruction that is stored in the memory and that can be run on the processor, where when the program or the instruction is executed by the processor, the steps of the method in the first aspect are implemented.

According to a fourth aspect, an embodiment of this application provides a non-transitory readable storage medium. The non-transitory readable storage medium stores a program or an instruction, and when the program or the instruction is executed by a processor, the steps of the method in the first aspect are implemented.

According to a fifth aspect, an embodiment of this application provides a chip. The chip includes a processor and a communications interface, the communications interface is coupled to the processor, and the processor is configured to run a program or an instruction to implement the method in the first aspect.

In the embodiments of this application, an electronic device may display at least one mode identifier according to a first input performed by a user, where each mode identifier is used to indicate a photographing mode corresponding to at least one image; and then display a photographing preview interface of a target photographing mode according to a second input performed by a user on a target mode identifier. After the user performs the first input, the electronic device may display the at least one mode identifier, to display a photographing mode corresponding to each image to the user, and the user may select a required photographing mode according to a use requirement, so that the electronic device displays a photographing preview interface of the photographing mode, and performs photographing based on the photographing mode, thereby implementing association between each photographing mode in an album application and a corresponding photographing mode in a camera application. Therefore, without manually exiting the album application and opening the camera application, the user may perform an operation in the camera application to rapidly invoke display of a photographing preview interface of a specific photographing mode, thereby reducing tedious operations performed by a user in a process of browsing an image in the album application and improving photographing efficiency.

BRIEF DESCRIPTION OF DRAWINGS

FIG. 1 is a schematic diagram of a photographing interface display method according to an embodiment of this application;

FIG. 7B is a tenth schematic diagram of an example of an interface of a mobile phone according to an embodiment of this application;

FIG. 8 is an eleventh schematic diagram of an example of an interface of a mobile phone according to an embodiment of this application;

DESCRIPTION OF EMBODIMENTS

Figure 2A:
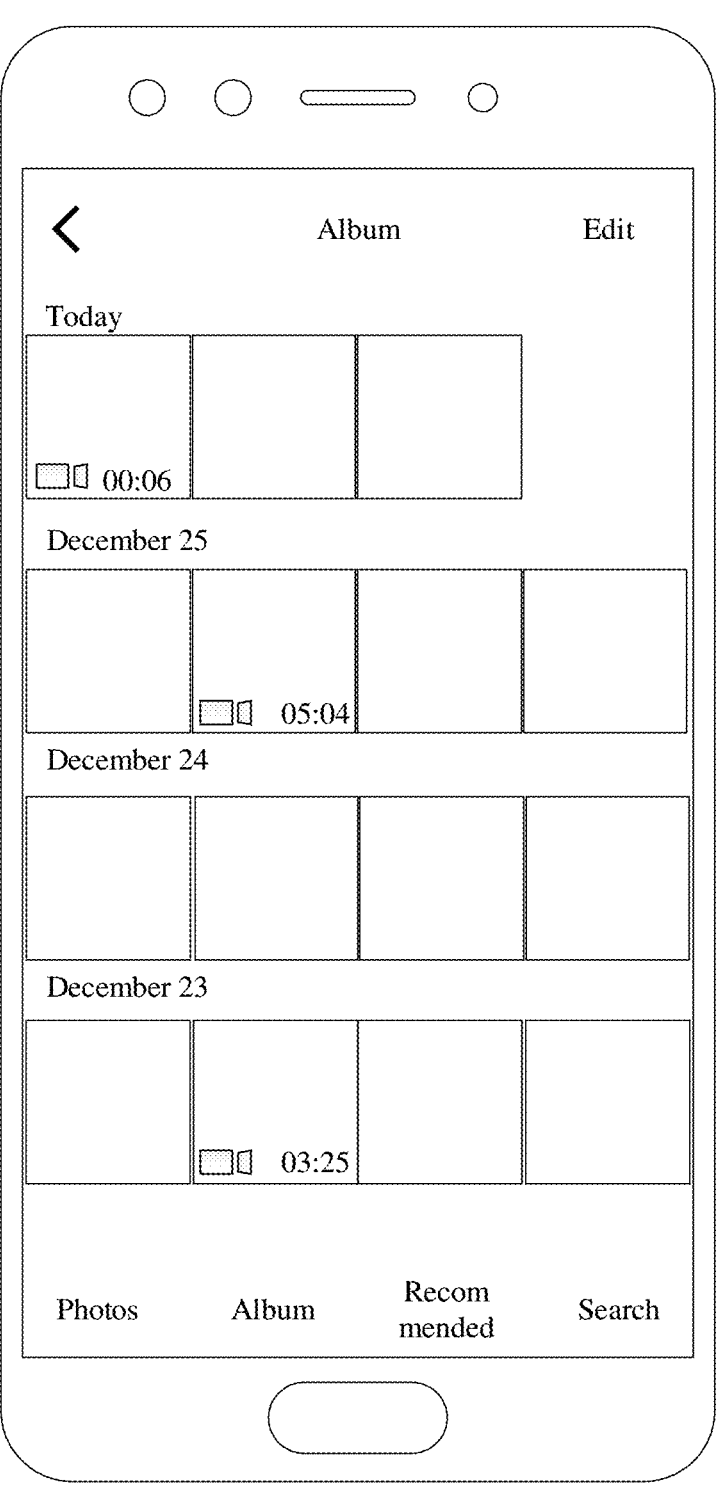
FIG. 2A is a first schematic diagram of an example of an interface of a mobile phone according to an embodiment of this application.

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects. An identifier in this application is used to indicate a character, a symbol, an image, and the like of information, and a control or another container may be used as a carrier for displaying the information, including but not limited to a character identifier, a symbol identifier, and an image identifier.

With reference to the accompanying drawings, a photographing interface display method provided in the embodiments of this application is described in detail by using specific embodiments and application scenes.

The embodiments of this application are applied to a scene in which a user may quickly invoke a camera application when viewing an image, to quickly perform photographing in a photographing mode corresponding to the viewed image. Generally, an electronic device may classify images according to a theme directory to which photographed images belong (that is, photographing modes corresponding to the photographed images), to create different folders, for example, different theme directories such as a night scene, a portrait, and background blurring. When the user browses an image of a specific theme directory, if the user needs to photograph an image of a same style (that is, an image in a same photographing mode), instead of exiting an album application and then opening the camera application to select a specific photographing mode as before, the user may directly perform an input on a current image page, so that the electronic device can quickly invoke the camera application according to the theme directory to which the image browsed by the user belongs, to directly jump to an interface of the photographing mode corresponding to the image and perform photographing, so as to save the image photographed in the photographing mode in a folder of the corresponding theme directory. In this way, operations of the user are simplified, and photographing efficiency of the electronic device is improved.

An embodiment of this application provides a photographing interface display method. FIG. 1 is a flowchart of a photographing interface display method according to an embodiment of this application. The method may be applied to a photographing interface display apparatus. As shown in FIG. 1, the photographing interface display method provided in this embodiment of this application may include the following steps 201 to 204.

Step 201: An electronic device receives a first input performed by a user on a first interface.

In this embodiment of this application, the first interface includes at least one thumbnail, and each thumbnail is used to indicate one image.

In this embodiment of this application, the user may open an album application, so that the electronic device displays a first interface of the album application to display at least one thumbnail, and then the user perform inputting on the first interface to trigger the electronic device to display photographing mode information of at least one image (that is, N mode identifiers described in the following embodiment).

It should be noted that an image in this embodiment of this application is a file stored in the album application, and may include an image in a narrow sense, may include a video, or may include a gif image.

Optionally, in this embodiment of this application, the first interface may be a main interface of the album application, or may be a display interface for displaying an original of a specific image.

Optionally, in this embodiment of this application, the first input is an input (for example, a touch and hold input) performed by a user on one thumbnail in the at least one thumbnail, and each mode identifier is used to indicate a photographing mode corresponding to one image.

It should be noted that the input (for example, a first input, a second input, or a third input) in this embodiment of this application may include but is not limited to a tap input, a touch and hold input, a drag input, and the like. The input in this embodiment of this application may also be referred to as an operation.

Optionally, in this embodiment of this application, the first interface further includes a first control. The first control is used to display an image classification interface, and the first input is an input performed by a user on the first control. Each mode identifier is used to indicate one folder, and each folder includes at least one image corresponding to one photographing mode.

It can be understood that after the user performs the first input on the first control, the electronic device may update the first interface to an image classification interface, and display at least one mode identifier, at least one folder, and a photographing control on the image classification interface. Each mode identifier corresponds to one folder, and at least one image included in one folder is an image photographed in a same photographing mode.

Optionally, in this embodiment of this application, the first control includes a first sub-control and a second sub-control. After the user performs an input on the first sub-control on the first interface, the electronic device may update the first interface to an image classification interface, and display the second sub-control on the image classification interface. After the user performs an input on the second sub-control, the electronic device may display at least one mode identifier, at least one folder, and a photographing control on the image classification interface.

Optionally, in this embodiment of this application, the at least one thumbnail may be a thumbnail of at least one image.

Step 202: The electronic device displays N mode identifiers in response to the first input.

In this embodiment of this application, each mode identifier is used to indicate a photographing mode corresponding to at least one image, and N is a positive integer.

It should be noted that the N mode identifiers may be used to indicate photographing modes corresponding to N images, and the N images are images indicated by the at least one thumbnail; or the N mode identifiers may be used to indicate a photographing mode corresponding to an image in at least one folder, each mode identifier corresponds to one folder, and one folder includes at least one image in a same photographing mode.

Optionally, in this embodiment of this application, the foregoing step 201 may be specifically implemented by the following step 201a, and the foregoing step 202 may be specifically implemented by the following step 202a.

Step 201a: The electronic device receives the first input performed by a user on a target thumbnail in the at least one thumbnail.

Step 202a: The electronic device displays a target mode identifier in a target region associated with the target thumbnail in response to the first input.

In this embodiment of this application, the target mode identifier is used to indicate a photographing mode of a target image indicated by the target thumbnail.

It should be noted that the target mode identifier may be one mode identifier or at least two mode identifiers.

Optionally, in this embodiment of this application, the electronic device may display at least one mode identifier on the at least one thumbnail in a multi-layer manner in response to the first input, and display the photographing control on the first interface.

In this embodiment of this application, each thumbnail corresponds to one mode identifier.

It can be understood that, for each thumbnail in the at least one thumbnail, after the user performs the first input on one thumbnail in the at least one thumbnail, the electronic device may display a mode identifier corresponding to one thumbnail on the one thumbnail in a layer manner.

Figure 2B:
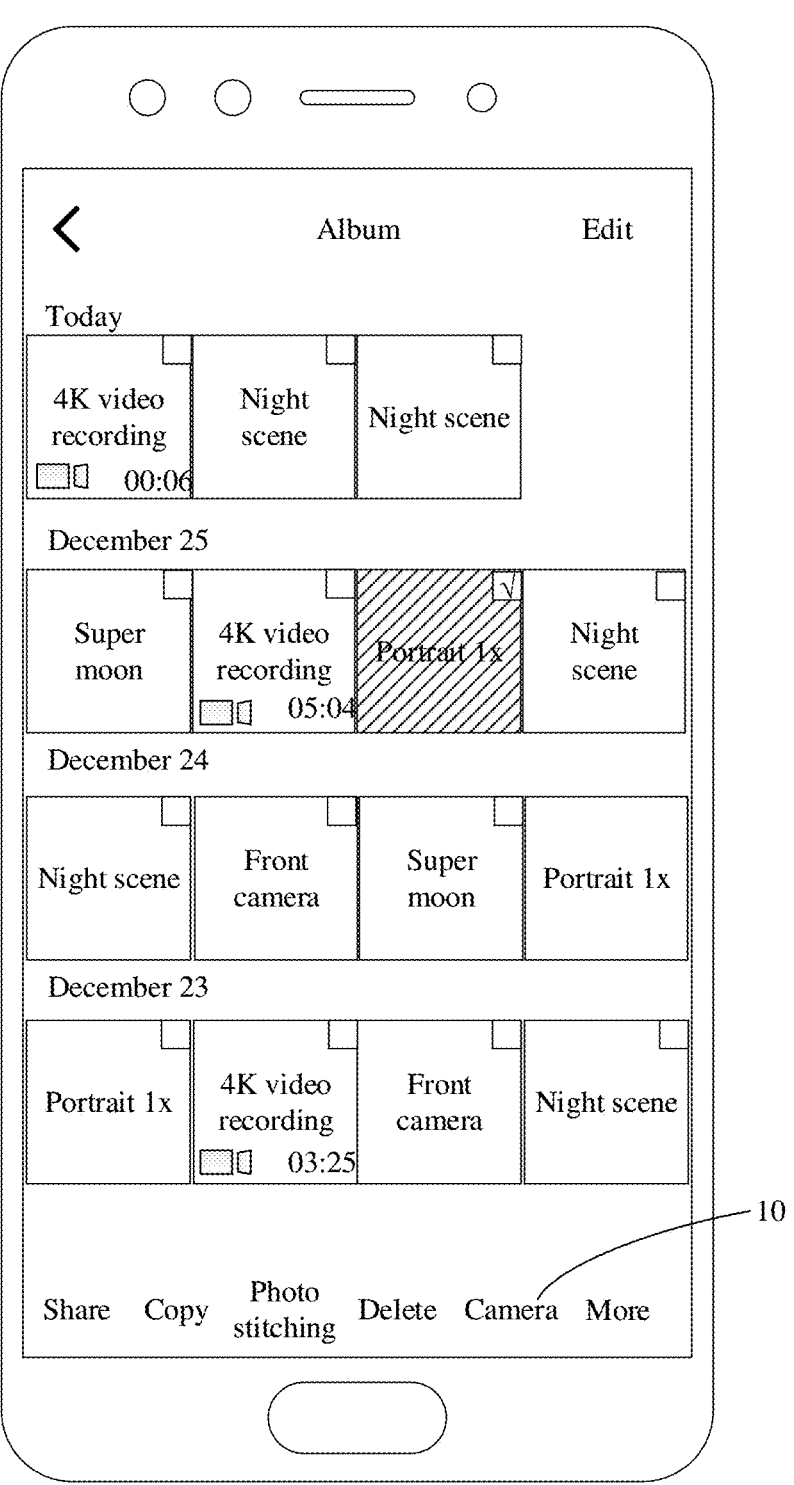
FIG. 2B is a second schematic diagram of an example of an interface of a mobile phone according to an embodiment of this application.

For example, an example in which the electronic device is a mobile phone is used for description. As shown in FIG. 2A, the mobile phone displays a first interface, and the first interface includes at least one thumbnail. After the user performs a first input on any thumbnail in the at least one thumbnail, as shown in FIG. 2B, the mobile phone may display a corresponding mode identifier on each thumbnail, to display a photographing mode (for example, a night scene photographing mode or a portrait photographing mode) corresponding to an image indicated by each thumbnail to the user, and display a photographing control (for example, a "camera" button 10).

It should be noted that an identifier in this embodiment of this application is used to indicate a character, a symbol, an image, and the like of information, and a control or another container may be used as a carrier for displaying the information, including but not limited to a character identifier, a symbol identifier, and an image identifier.

In this embodiment of this application, a function of browsing the album application by a user is extended. The user may select any image from the album application to trigger the electronic device to quickly jump to an interface of a photographing mode corresponding to the any image in a camera application and implement an association between each theme directory in the album application and a corresponding photographing mode in the camera application. This reduces cumbersome operations that the user needs to manually exit the album application and open the camera application in a process of browsing an image in the album application, thereby improving photographing efficiency of the electronic device.

Optionally, in this embodiment of this application, the foregoing step 201 may be specifically implemented by the following step 201b, and the foregoing step 202 may be specifically implemented by the following step 202b.

Step 201b: The electronic device receives the first input performed by a user on a target control.

In this embodiment of this application, each mode identifier in the N mode identifiers corresponds to one folder, and each folder includes at least one image in a same photographing mode.

Step 202b: The electronic device updates the first interface to a second interface in response to the first input.

In this embodiment of this application, the second interface includes N folders, the N mode identifiers, and a photographing control.

Optionally, in this embodiment of this application, the electronic device may update the first interface to an image classification interface in response to the first input, and display the photographing control on the image classification interface.

In this embodiment of this application, the image classification interface includes at least one mode identifier.

It can be understood that, after the user performs the first input on the first control, the electronic device may display an image classification interface, to display at least one mode identifier and at least one folder on the image classification interface. Each mode identifier corresponds to one folder, and a photographing mode corresponding to an image in each folder is displayed to the user in a folder manner.

Optionally, in this embodiment of this application, the at least one mode identifier may be a name of at least one photographing mode.

Figure 3:
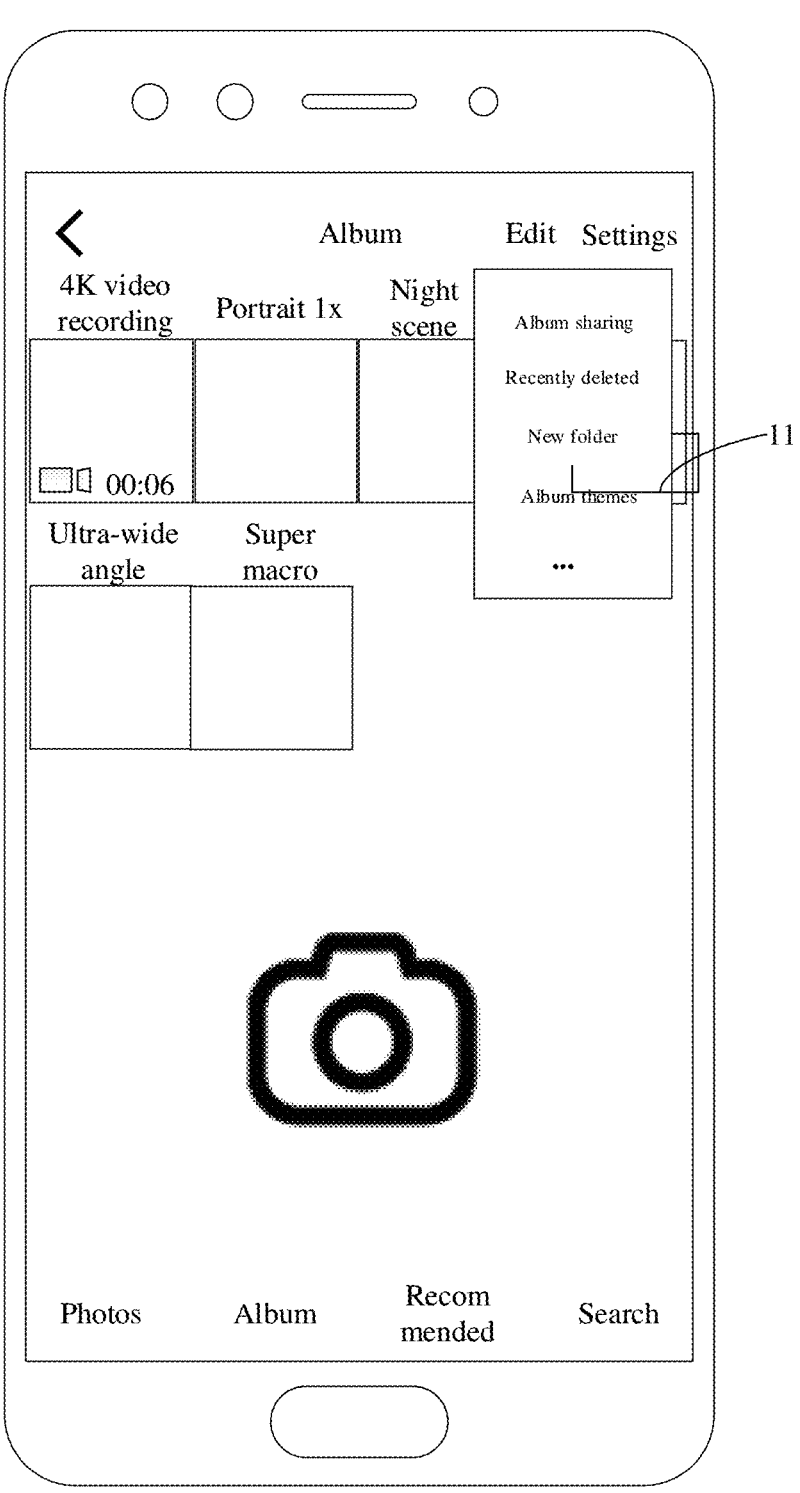
FIG. 3 is a third schematic diagram of an example of an interface of a mobile phone according to an embodiment of this application.

For example, with reference to FIG. 2A, as shown in FIG. 3, after the user performs the first input on a first sub-control (for example, an "album" control) on the first interface, the mobile phone may update the first interface to an image classification interface, and display a second sub-control (for example, an "album theme classification" control 11) on the image classification interface. The user may perform an input on the second sub-control, so that the mobile phone can display at least one mode identifier, at least one folder, and a photographing control on the image classification interface. Each mode identifier is used to indicate a photographing mode (for example, a 4K video recording mode, a night scene photographing mode, or a portrait photographing mode) corresponding to an image in one folder.

In this embodiment of this application, a function of browsing the album application by a user is extended. The user may perform an input on the first control to trigger the electronic device to display the image classification interface. Then, the user may trigger, in an interactive manner of moving an image, the electronic device to open an interface of a photographing mode corresponding to the moving image in a camera application and implement an association between each theme directory in the album application and a corresponding photographing mode in the camera application. This reduces cumbersome operations that the user needs to manually exit the album application and open the camera application in a process of browsing an image in the album application, thereby improving photographing efficiency of the electronic device.

Step 203: The electronic device receives a second input performed by a user on a target mode identifier in the N mode identifiers.

Optionally, in this embodiment of this application, the second input is a tap input or a touch and hold input performed by a user on the target mode identifier.

Optionally, in this embodiment of this application, the second input is an input performed by a user on the target mode identifier and the photographing control.

Step 204: The electronic device displays a photographing preview interface of a target photographing mode in response to the second input.

In this embodiment of this application, the target photographing mode is a photographing mode corresponding to the target mode identifier.

Optionally, in this embodiment of this application, after receiving the second input, the electronic device may obtain a photographing mode indicated by the target mode identifier, and directly jump to a photographing preview interface of the photographing mode, to perform photographing in the photographing mode.

Optionally, in this embodiment of this application, after receiving the second input, the electronic device may obtain a photographing mode indicated by the target mode identifier, and directly display a photographing preview interface on a current interface in an overlay manner (for example, display in a floating window or a layer form on the current interface).

Figure 4:
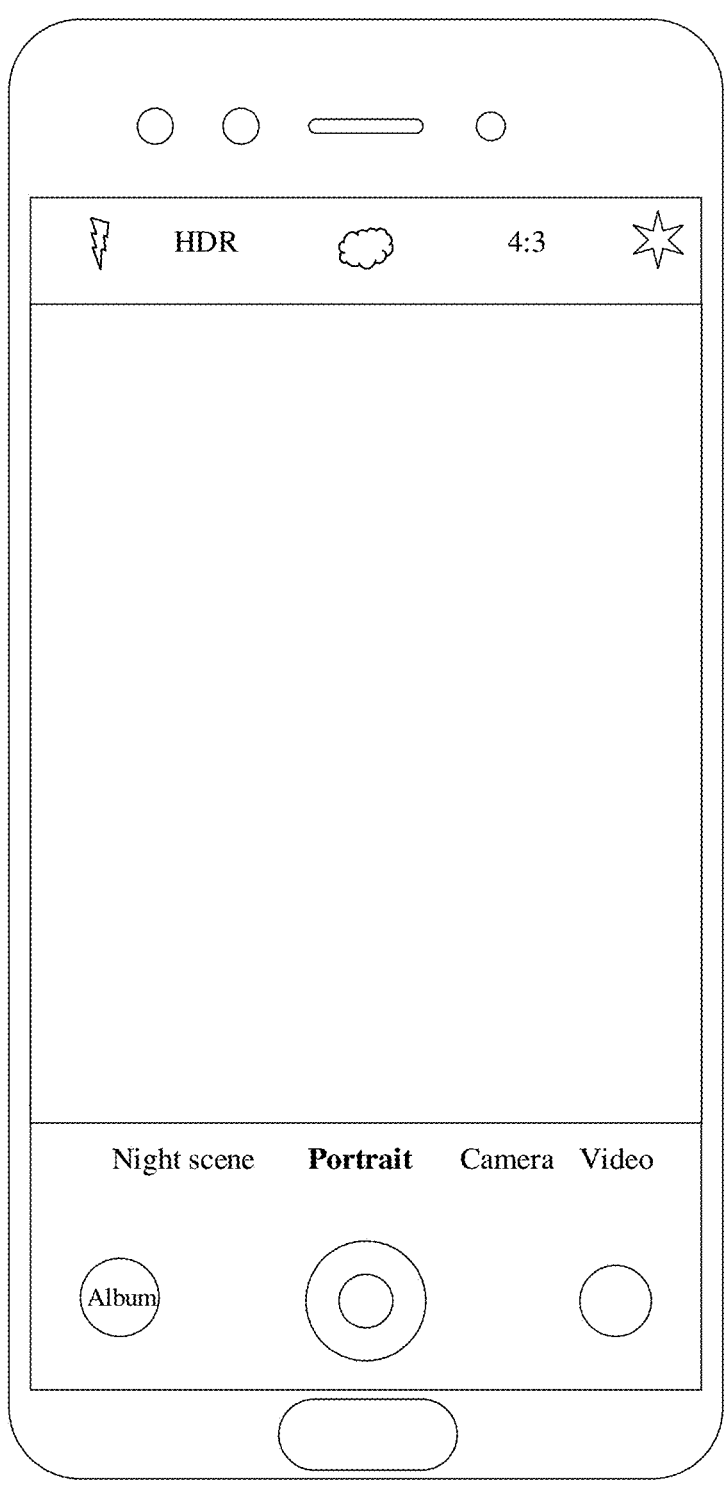
FIG. 4 is a fourth schematic diagram of an example of an interface of a mobile phone according to an embodiment of this application.

For example, with reference to FIG. 2B, as shown in FIG. 4, after the user performs a tap input on the target mode identifier (for example, "portrait") and the photographing control, the mobile phone may display a photographing preview interface of a portrait photographing mode, that is, a photographing preview interface in FIG. 4.

Optionally, in this embodiment of this application, after displaying the photographing preview interface of the target photographing mode, the electronic device may directly perform photographing or recording automatically, or perform photographing or recording after manual trigger by a user.

Optionally, in this embodiment of this application, the second input includes a first sub-input and a second sub-input. The first sub-input is an input performed by a user on the target mode identifier in the N mode identifiers. After the foregoing step 202b, the photographing preview interface display method provided in this embodiment of this application further includes the following steps 301 to 303.

Step 301: The electronic device displays T thumbnails and the photographing control in response to the first sub-input.

In this embodiment of this application, the T thumbnails are used to indicate T images in a folder corresponding to the target photographing mode, and T is a positive integer.

Step 302: The electronic device receives the second sub-input performed by a user on a target thumbnail in the T thumbnails and the photographing control.

Step 303: The electronic device displays the photographing preview interface of the target photographing mode of an image corresponding to the target thumbnail in response to the second sub-input.

In this embodiment of this application, the electronic device displays N thumbnails and the photographing control in response to the first sub-input. In response to the second sub-input, the electronic device displays the photographing preview interface of the target photographing mode, and performs photographing based on the target photographing mode.

In this embodiment of this application, the N thumbnails are identifiers of N images in the photographing mode corresponding to the target mode identifier, the first sub-input is an input performed by a user on the target mode identifier, and N is a positive integer.

It can be understood that in a case that the image classification interface is displayed (that is, in a case that the foregoing step 202b is performed), the user may perform the first sub-input (for example, a tap input) on the target mode identifier, so that the electronic device opens a folder corresponding to the target mode identifier, that is, the image classification interface is updated to a second interface, to display identifiers (that is, N thumbnails) of images in the folder corresponding to the target mode identifier and the photographing control are displayed on the second interface. The images indicated by the N thumbnails are corresponding to a same photographing mode, and the user may view any image in the photographing mode corresponding to the folder.

Optionally, in this embodiment of this application, the first sub-input may include but is not limited to a tap input performed by a user on the target mode identifier, or a tap input performed by a user on the folder corresponding to the target mode identifier.

Optionally, in this embodiment of this application, the second sub-input is an input performed by a user on any thumbnail in the N thumbnails and the photographing control.

In this embodiment of this application, after the electronic device displays the N thumbnails, the user may perform the second sub-input on any thumbnail in the N thumbnails, to trigger the electronic device to display a photographing preview interface of a photographing mode (that is, a photographing mode corresponding to images indicated by the N thumbnails) corresponding to the any thumbnail.

Optionally, in this embodiment of this application, the foregoing second sub-input may be specifically an input performed by a user to drag any thumbnail in the N thumbnails to the photographing control.

Figure 5A:
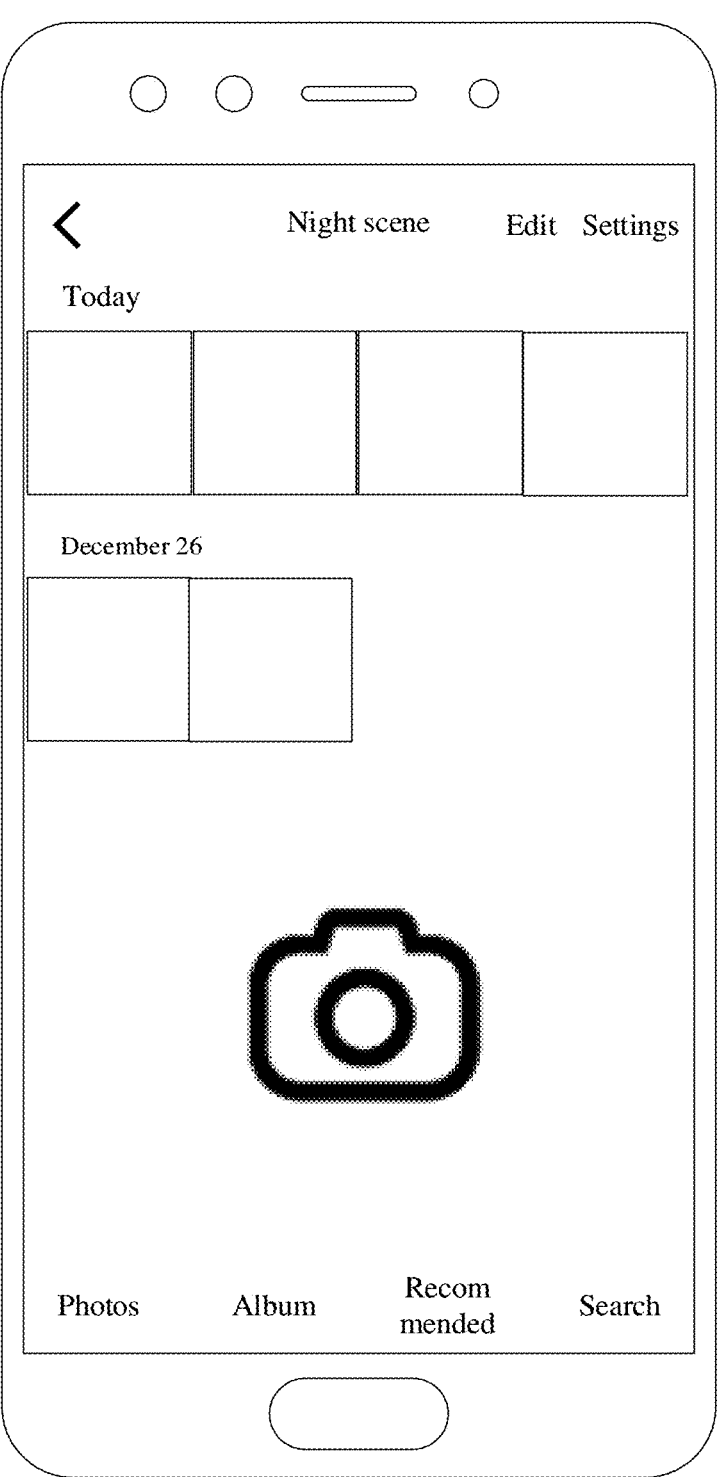
FIG. 5A is a fifth schematic diagram of an example of an interface of a mobile phone according to an embodiment of this application.
Figure 5B:
FIG. 5B is a sixth schematic diagram of an example of an interface of a mobile phone according to an embodiment of this application.

For example, with reference to FIG. 3, as shown in FIG. 5A, after the user performs the first sub-input on one mode identifier (for example, a "night scene") on the image classification interface, the mobile phone may display a plurality of thumbnails (for example, a plurality of image thumbnails) and the photographing control, where the plurality of thumbnails are identifiers of a plurality of images photographed in a night scene photographing mode. After the user drag any thumbnail in the plurality of thumbnails to the photographing control, as shown in FIG. 5B, the mobile phone may display a photographing preview interface of the night scene photographing mode, and perform photographing based on the night scene photographing mode.

Optionally, in this embodiment of this application, the electronic device may directly move a thumbnail to the photographing control, or may generate a new icon to indicate this thumbnail, and control the icon to move to the photographing control.

In this embodiment of this application, the user may perform an input on any mode identifier on the image classification interface, to quickly view an image in a folder corresponding to the any mode identifier, and the user may continue to perform an input on an identifier of any image in the folder, so that the electronic device quickly jumps to a photographing preview interface of a corresponding photographing mode. This reduces cumbersome operations that the user needs to manually exit the album application and open the camera application in a process of browsing an image in the album application, thereby improving photographing efficiency of the electronic device.

Optionally, in this embodiment of this application, the foregoing step 203 may be specifically implemented by the following step 203a. In addition, before the "displaying a photographing preview interface of a target photographing mode" in step 204, the photographing interface display method provided in this embodiment of this application further includes the following step 205, and the foregoing step 204 may be specifically implemented by the following step 204c.

Step 203a: The electronic device receives the second input performed by a user on M mode identifiers in the N mode identifiers.

Step 205: The electronic device displays target photographing information of M photographing modes indicated by the M mode identifiers.

In this embodiment of this application, the target photographing information includes at least one of the following: a quantity of photographing times, a quantity of images photographed at intervals, and a photographing sequence.

The quantity of photographing times is a total quantity of photographing times of each photographing mode, the quantity of images photographed at intervals is a quantity of images photographed at an interval between two different photographing modes, and the photographing sequence is a photographing sequence of the M photographing modes indicated by the M mode identifiers, where M is a positive integer.

Optionally, in this embodiment of this application, the target photographing information includes at least one of the following: a plurality of quantities of photographing times, a plurality of quantities of images photographed at intervals, and a plurality of pieces of sequence information, where each quantity of photographing times is a total quantity of photographing times corresponding to one photographing mode in a plurality of photographing modes, each quantity of images photographed at intervals is a quantity of photographing times at an interval during switching from one photographing mode in the plurality of photographing modes to another photographing mode, and each piece of sequence information is used to indicate a display sequence of a photographing preview interface of one photographing mode in the plurality of photographing modes.

It should be noted that a quantity of images photographed at intervals for one photographing mode may be understood as: the electronic device needs to perform photographing several times in the one photographing mode to switch to another photographing mode. For example, if the plurality of photographing modes are a photographing mode 1 and a photographing mode 2, a total quantity of photographing times corresponding to the photographing mode 1 is 3, a quantity of images photographed at intervals corresponding to the photographing mode 1 is 2, a total quantity of photographing times corresponding to the photographing mode 2 is 1, and a quantity of images photographed at intervals corresponding to the photographing mode 2 is 1, the electronic device switches to the photographing mode 2 for photographing once after performing photographing twice in the photographing mode 1, and then the electronic device switches to the photographing mode 1 for photographing once.

Step 204c: The electronic device sequentially displays photographing preview interfaces of the M photographing modes according to the target photographing information in response to the second input.

Optionally, in this embodiment of this application, the target mode identifier is a plurality of identifiers, and the target photographing mode is a plurality of photographing modes. Before displaying the photographing preview interface of the target photographing mode, the electronic device may display target photographing information corresponding to the plurality of photographing modes.

In this embodiment of this application, after the user performs the second input on a plurality of identifiers in the at least one mode identifier, the electronic device may obtain and display information such as a quantity of photographing times, a photographing sequence, and a quantity of images photographed at intervals that are of each photographing mode in a plurality of photographing modes corresponding to the plurality of identifiers, and then jump to a photographing preview interface of one photographing mode in the camera application (that is, a photographing preview interface of a photographing mode in a first photographing sequence) to perform photographing until photographing in the plurality of photographing modes is completed.

Optionally, in this embodiment of this application, the target photographing information may be default in the system, or may be determined according to an input sequence of the user for the plurality of identifiers in the at least one mode identifier, or may be preset by a user, or may be obtained according to a history use record of the user.

Figure 6A:
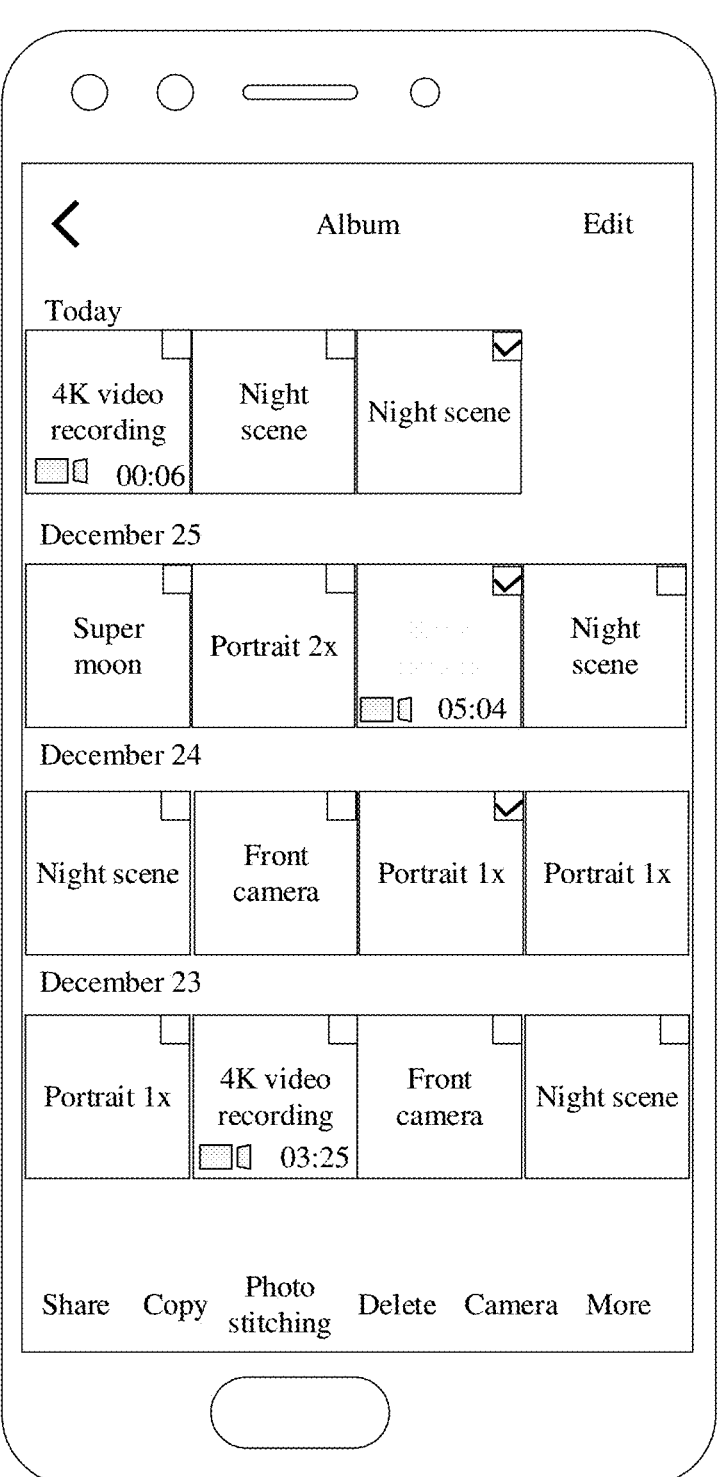
FIG. 6A is a seventh schematic diagram of an example of an interface of a mobile phone according to an embodiment of this application.
Figure 6B:
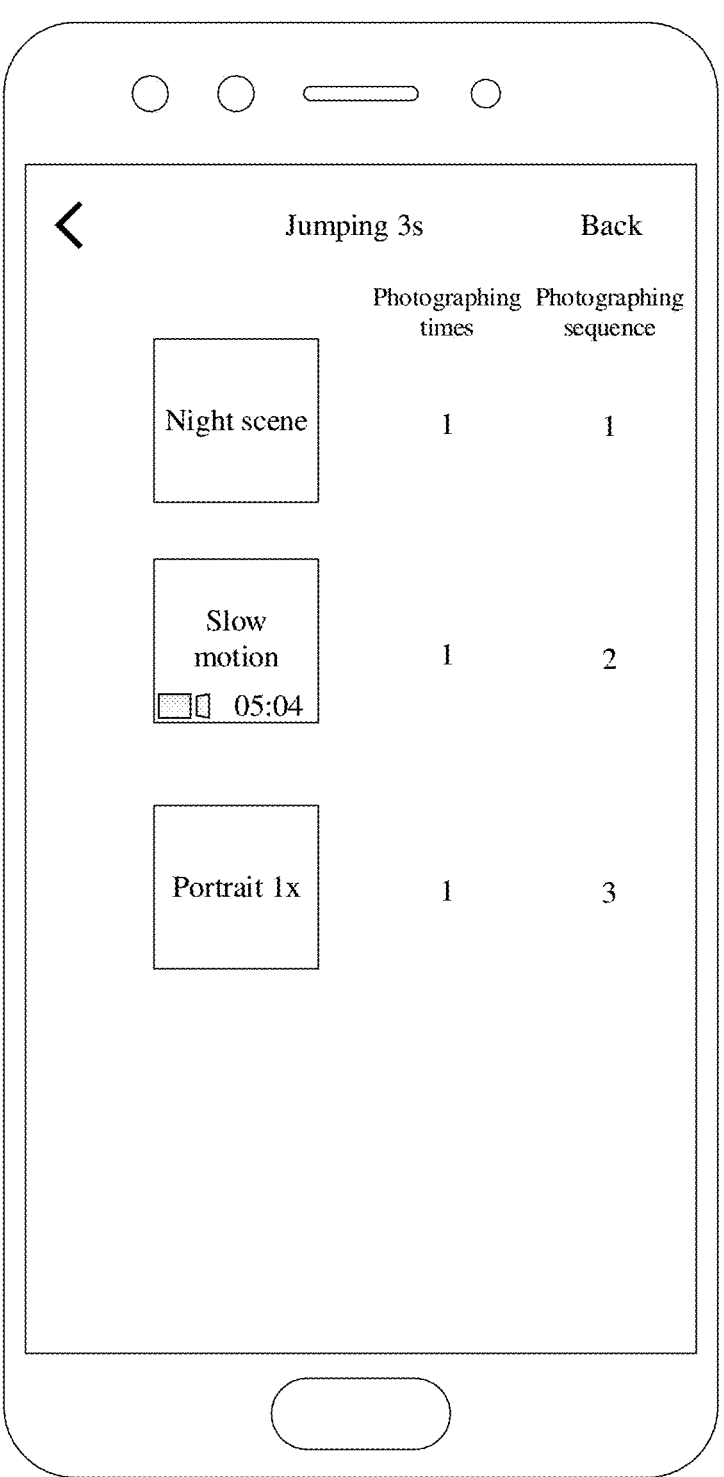
FIG. 6B is an eighth schematic diagram of an example of an interface of a mobile phone according to an embodiment of this application.

For example, with reference to FIG. 2B, as shown in FIG. 6A, the user may select a plurality of identifiers from the at least one mode identifier, and perform a tap input on a "photographing" button, so that the mobile phone displays an interface shown in FIG. 6B, to display quantities of photographing times and photographing sequences corresponding to the plurality of photographing modes (for example, a night scene photographing mode, a slow motion photographing mode, or a portrait photographing mode) on the interface.

It can be understood that, each time a photographing preview interface of one photographing mode is displayed, the electronic device performs photographing in the one photographing mode, and then continues to perform photographing in another photographing mode when switching to a photographing preview interface of the another photographing mode until photographing in all photographing modes in the plurality of photographing modes is completed.

It should be noted that, assuming that the target photographing information includes a plurality of quantities of photographing times, a plurality of quantities of images photographed at intervals, and a plurality of quantities of pieces of sequence information, that the electronic device sequentially displays photographing preview interfaces of a plurality of photographing modes according to the target photographing information, and performs photographing based on the plurality of photographing modes may be understood as: The electronic device first displays a photographing preview interfaces of a photographing modes whose sequence information is 1 (that is, the first) according to the plurality of pieces of sequence information, and performs at least one time of photographing in the photographing mode according to a quantity of photographing times and a quantity of images photographed at intervals that are corresponding to the photographing mode (the at least one time of photographing is less than or equal to the quantity of photographing times, that is, if the quantity of images photographed at intervals is the same as the quantity of photographing times, the at least one time of photographing is equal to the quantity of photographing times, and if the quantity of images photographed at intervals is less than or equal to the quantity of photographing times, the at least one time of photographing is equal to the quantity of images photographed at intervals); then, after completing the at least one time of photographing, displays a photographing preview interface of a next photographing mode (that is, a photographing mode whose sequence information is 2 (that is, the second)), and performs at least one time of photographing in the photographing mode according to a quantity of photographing times and a quantity of images photographed at intervals that are corresponding to the photographing mode; and by analogy, completes photographing in all photographing modes in the plurality of photographing modes.

For example, it is assumed that the plurality of photographing modes are a photographing mode 1, a photographing mode 2, and a photographing mode 3. A total quantity of photographing times corresponding to the photographing mode 1 is 3, a quantity of images photographed at intervals corresponding to the photographing mode 1 is 2, a total quantity of photographing times corresponding to the photographing mode 2 is 1, a quantity of images photographed at intervals corresponding to the photographing mode 2 is 1, a total quantity of photographing times corresponding to the photographing mode 3 is 2, and a quantity of images photographed at intervals corresponding to the photographing mode 3 is 1. In this case, the electronic device switches to the photographing mode 2 for photographing once after performing photographing twice in the photographing mode 1, the electronic device switches to the photographing mode 1 for photographing once after switching to the photographing mode 3 for photographing once, and then the electronic device switches to the photographing mode 3 for photographing once.

In this embodiment of this application, the user may select a plurality of images, so that the electronic device quickly jumps to an interface of one photographing mode in the camera application according to the target photographing information corresponding to the plurality of photographing modes, and after photographing in the photographing mode is completed, continues to display an interface of a next photographing mode to perform photographing in the photographing mode, thereby implementing photographing in the plurality of photographing modes and implementing an association between each theme directory in the album application and the plurality of photographing modes in the camera application This reduces cumbersome operations that the user needs to manually exit the album application and open the camera application in a process of browsing an image in the album application, thereby improving photographing efficiency of the electronic device and increasing user interest.

Optionally, in this embodiment of this application, before displaying the target photographing information corresponding to the plurality of photographing modes, the electronic device may display a plurality of first windows, so that the user may perform a fourth input on the plurality of first windows. In response to the fourth input, the electronic device may adjust default quantities of photographing times, default quantities of images photographed at intervals, and default display sequences of the photographing preview interfaces that are corresponding to the plurality of photographing modes, and sequentially display the photographing preview interfaces of the plurality of photographing modes according to the adjusted display sequences, the adjusted quantities of photographing times, and the adjusted quantities of images photographed at intervals.

In this embodiment of this application, each first window corresponds to one photographing mode in the plurality of photographing modes, and each first window includes a default quantity of photographing times and a default quantity of images photographed at intervals that are corresponding to one photographing mode.

Optionally, in this embodiment of this application, the first interface further includes a second control. The second input may include two sub-inputs, where one sub-input is an input performed by a user on a plurality of identifiers in the at least one mode identifier, and the other sub-input is an input performed by a user on the second control. The second control is used to display a plurality of first windows.

Figure 7A:
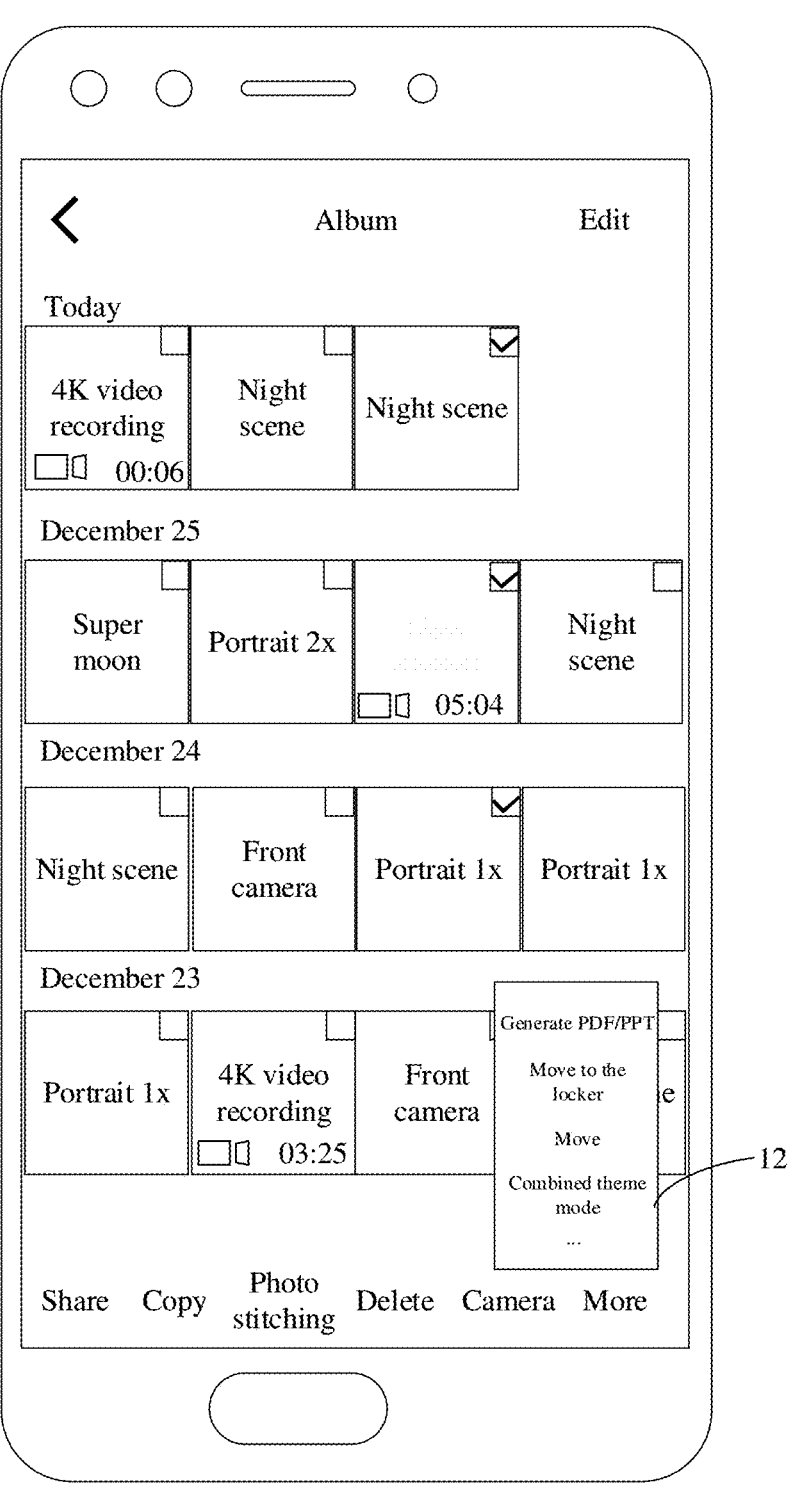
FIG. 7A is a ninth schematic diagram of an example of an interface of a mobile phone according to an embodiment of this application.

For example, with reference to FIG. 6A, as shown in FIG. 7A, after selecting a plurality of identifiers from the at least one mode identifier, the user may perform an input on a second control 12 (for example, a "more" button and a "combined theme mode" button), so that the mobile phone displays an interface shown in FIG. 7B, to display a plurality of first windows on the interface, so that the user can perform an input on the plurality of first windows, to customize photographing related information corresponding to the plurality of photographing modes (for example, quantities of photographing times and photographing sequences).

It should be noted that the default quantity of photographing times may be understood as a quantity of photographing times that is default in the system or a quantity of photographing times that has been previously set by a user. The default quantity of images photographed at intervals may be understood as a quantity of images photographed at intervals that is default in the system or a quantity of images photographed at intervals that has been previously set by a user.

Optionally, in this embodiment of this application, the fourth input may be a drag input performed by a user on any first window in the plurality of first windows, to adjust display sequences of the plurality of first windows, and determine the display sequences of the plurality of first windows as display sequences of the photographing preview interfaces corresponding to the plurality of photographing modes.

Optionally, in this embodiment of this application, the fourth input may be an input performed by a user on a quantity of photographing times (for example, a modify input) in any first window in the plurality of first windows, so that the electronic device adjusts a quantity of photographing times in a photographing mode corresponding to the any first window.

Optionally, in this embodiment of this application, the fourth input may be an input performed by a user on a quantity of images photographed at intervals in any first window in the plurality of first windows, so that the electronic device adjusts a quantity of images photographed at intervals in a photographing mode corresponding to the any first window.

It can be understood that when the user needs to adjust quantities of photographing times, quantities of images photographed at intervals, and display sequences of photographing preview interfaces that are corresponding to the plurality of photographing modes, the fourth input may include three sub-inputs, to customize the quantities of photographing times, the quantities of images photographed at intervals, and the display sequences of the photographing preview interfaces through the three sub-inputs.

For example, with reference to FIG. 7B, as shown in FIG. 8, the user may perform a drag input on any first window in the plurality of first windows to adjust display sequences of the plurality of first windows, and perform a modify input on a quantity of photographing times and a quantity of images photographed at intervals in the any first window in the plurality of first windows, so that the mobile phone adjusts quantities of photographing times and quantities of images photographed at intervals that are corresponding to the plurality of photographing modes. Therefore, the electronic device may first enter a photographing preview interface a slow motion photographing mode, jump to/switch to a photographing preview interface of a portrait photographing mode after performing photographing once in the slow motion photographing mode, jump to a photographing preview interface of a night scene photographing mode after performing photographing once in the portrait photographing mode, and perform photographing in the portrait photographing mode for a remaining quantity of times after performing photographing once in the night scene photographing mode (that is, jump to the photographing preview interface of the portrait photographing mode, and perform photographing in the portrait photographing mode for the remaining quantity of times).

Optionally, in this embodiment of this application, after the foregoing step 205, the photographing interface display method provided in this embodiment of this application further includes the following step 401 and step 402, and the foregoing step 204c may be specifically implemented by the following step 204c1.

Step 401: The electronic device receives a third input performed by a user on the target photographing information.

Step 402: Update the target photographing information of the M photographing modes in response to the third input.

Step 204c1: The electronic device sequentially displays the photographing preview interfaces of the M photographing modes according to the updated target photographing information in response to the second input.

Optionally, in this embodiment of this application, the foregoing step 204c1 may be specifically implemented by the following step 204c11 and step 204c12.

Step 204c11: The electronic device displays a photographing preview interface of an $i^{th}$ photographing mode according to the photographing sequence in the target photographing information in response to the second input, and starts to perform image photographing.

Step 204c12: The electronic device displays a photographing preview interface of an $(i+1)^{th}$ photographing mode in a case that a quantity of images photographed according to an $i^{th}$ quantity of photographing times in the $i^{th}$ photographing mode is equal to a quantity of images photographed at an $i^{th}$ interval, where i is a positive integer, and i≤M.

In this embodiment of this application, the user may manually change a total quantity of photographing times in each photographing mode, a corresponding quantity of images photographed at intervals during switching from one photographing mode to another photographing mode, a photographing sequence of each photographing mode, and the like, so that photographing effects of the electronic device are more diversified.

This embodiment of this application provides a photographing interface display method. In a case that at least one thumbnail is displayed, an electronic device may display at least one mode identifier according to a first input performed by a user, where each mode identifier is used to indicate a photographing mode corresponding to at least one image; and then displays a photographing preview interface of a target photographing mode according to a second input performed by a user on a target mode identifier, and performs photographing based on the target photographing mode. After the user performs the first input, the electronic device may display the at least one mode identifier, to display a photographing mode corresponding to each image to the user, and the user may select a required photographing mode according to a use requirement, so that the electronic device displays a photographing preview interface of the photographing mode, and performs photographing based on the photographing mode, thereby implementing association between each photographing mode in an album application and a corresponding photographing mode in a camera application. Therefore, without manually exiting the album application and opening the camera application, the user may perform an operation in the camera application to rapidly invoke display of a photographing preview interface of a specific photographing mode, thereby reducing tedious operations performed by a user in a process of browsing an image in the album application and improving photographing efficiency.

It should be noted that the photographing interface display method provided in the embodiments of this application may be performed by a photographing interface display apparatus, or a control module that is in the photographing interface display apparatus and that is configured to perform the photographing interface display method. In the embodiments of this application, that the photographing interface display apparatus performs the photographing interface display method is used as an example to describe the photographing interface display apparatus provided in the embodiments of this application.

Figure 9:
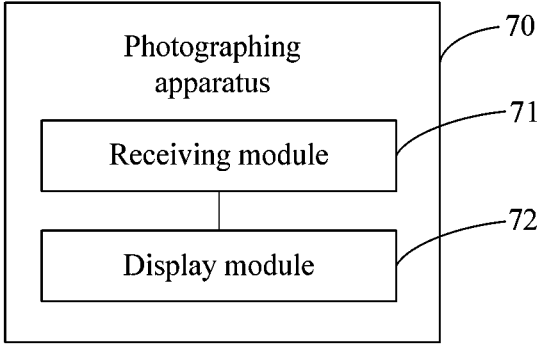
FIG. 9 is a schematic structural diagram of a photographing interface display apparatus according to an embodiment of this application.

FIG. 9 is a possible schematic structural diagram of a photographing interface display apparatus according to an embodiment of this application. As shown in FIG. 9, a photographing interface display apparatus 70 may include a receiving module 71 and a display module 72.

The receiving module 71 is configured to receive a first input performed by a user on a first interface, where the first interface includes at least one thumbnail, and each thumbnail is used to indicate one image. The display module 72 is configured to display N mode identifiers in response to the first input received by the receiving module 71, where each mode identifier is used to indicate a photographing mode of at least one image. The receiving module 71 is further configured to receive a second input performed by a user on a target mode identifier in the N mode identifiers. The display module 72 is further configured to display a photographing preview interface of a target photographing mode in response to the second input received by the receiving module 71, where the target photographing mode is a photographing mode corresponding to the target mode identifier.

In a possible implementation, the receiving module is specifically configured to receive the first input performed by a user on a target thumbnail in the at least one thumbnail.

The display module is specifically configured to display the target mode identifier in a target region associated with the target thumbnail, where the target mode identifier is used to indicate a photographing mode of a target image indicated by the target thumbnail.

In a possible implementation, the receiving module is specifically configured to receive the second input performed by a user on M mode identifiers in the N mode identifiers. The display module is further configured to: before the photographing preview interface of the target photographing mode is displayed, display target photographing information of M photographing modes indicated by the M mode identifiers. The target photographing information includes at least one of the following: a quantity of photographing times, a quantity of images photographed at intervals, and a photographing sequence; and the quantity of photographing times is a total quantity of photographing times of each photographing mode, the quantity of images photographed at intervals is a quantity of images photographed at an interval between two different photographing modes, and the photographing sequence is a photographing sequence of the M photographing modes indicated by the M mode identifiers, where M is a positive integer. The display module is specifically configured to sequentially display photographing preview interfaces of the M photographing modes according to the target photographing information.

In a possible implementation, the photographing interface display apparatus further includes an updating module. The receiving module is further configured to: after the target photographing information of the M photographing modes indicated by the M mode identifiers is displayed, receive a third input performed by a user on the target photographing information. The updating module is configured to update the target photographing information of the M photographing modes in response to the third input received by the receiving module. The display module is specifically configured to sequentially display the photographing preview interfaces of the M photographing modes according to the updated target photographing information.

In a possible implementation, the display module is specifically configured to: display a photographing preview interface of an $i^{th}$ photographing mode according to the photographing sequence in the target photographing information, and start to perform image photographing; and display a photographing preview interface of an $(i+1)^{th}$ photographing mode in a case that a quantity of images photographed according to an $i^{th}$ quantity of photographing times in the $i^{th}$ photographing mode is equal to a quantity of images photographed at an $i^{th}$ interval, where i is a positive integer, and i≤M.

In a possible implementation, the receiving module is specifically configured to receive the first input performed by a user on a target control, where each mode identifier in the N mode identifiers corresponds to one folder, and each folder includes at least one image of a same photographing mode. The display module is specifically configured to update the first interface to a second interface, where the second interface includes N folders, the N mode identifiers, and a photographing control.

In a possible implementation, the receiving module is specifically configured to receive the second input performed by a user on the target mode identifier in the N mode identifiers and the photographing control.

In a possible implementation, the second input includes a first sub-input and a second sub-input, and the first sub-input is an input performed by a user on the target mode identifier in the N mode identifiers. The display module is further configured to: after the first interface is updated to the second interface, display T thumbnails and the photographing control in response to the first sub-input, where the T thumbnails are used to indicate T images in a folder corresponding to the target photographing mode, and T is a positive integer. The receiving module is further configured to receive the second sub-input performed by a user on a target thumbnail in the T thumbnails and the photographing control. The display module is further configured to display the photographing preview interface of the target photographing mode of an image corresponding to the target thumbnail in response to the second sub-input.

This embodiment of this application provides a photographing interface display apparatus. After a user performs a first input, the photographing interface display apparatus may display at least one mode identifier, to display a photographing mode corresponding to each image to the user, and the user may select a required photographing mode according to a use requirement, so that the photographing interface display apparatus displays a photographing preview interface of the photographing mode, and performs photographing based on the photographing mode, thereby implementing association between each photographing mode in an album application and a corresponding photographing mode in a camera application. Therefore, without manually exiting the album application and opening the camera application, the user may perform an operation in the camera application to rapidly invoke display of a photographing preview interface of a specific photographing mode, thereby reducing tedious operations performed by a user in a process of browsing an image in the album application and improving photographing efficiency.

The photographing interface display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (ultra-mobile personal computer, UMPC), a netbook, or a personal digital assistant (personal digital assistant, PDA). The non-mobile electronic device may be a server, a network attached storage (Network Attached Storage, NAS), a personal computer (personal computer, PC), a television (television, TV), an automated teller machine, or a self-service machine. This is not specifically limited in this embodiment of this application.

The photographing interface display apparatus in this embodiment of this application may be an apparatus with an operating system. The operating system may be an Android (Android) operating system, an iOS operating system, or another possible operating system. This is not specifically limited in this embodiment of this application.

The photographing interface display apparatus provided in this embodiment of this application can implement the processes implemented in the foregoing method embodiment, and can achieve a same technical effect. To avoid repetition, details are not described herein again.

Figure 10:
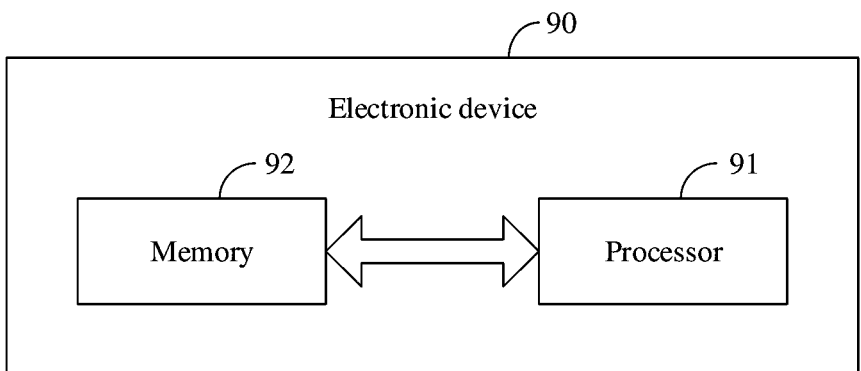
FIG. 10 is a first schematic diagram of a hardware structure of an electronic device according to an embodiment of this application.

Optionally, as shown in FIG. 10, an embodiment of this application further provides an electronic device 90, including a processor 91, a memory 92, and a program or an instruction that is stored in the memory 92 and that can be run on the processor 91. The program or the instruction is executed by the processor 91 to implement the processes of the foregoing method embodiment and a same technical effect can be achieved. To avoid repetition, details are not described herein again.

It should be noted that the electronic device in this embodiment of this application includes the foregoing mobile electronic device and the foregoing non-mobile electronic device.

Figure 11:
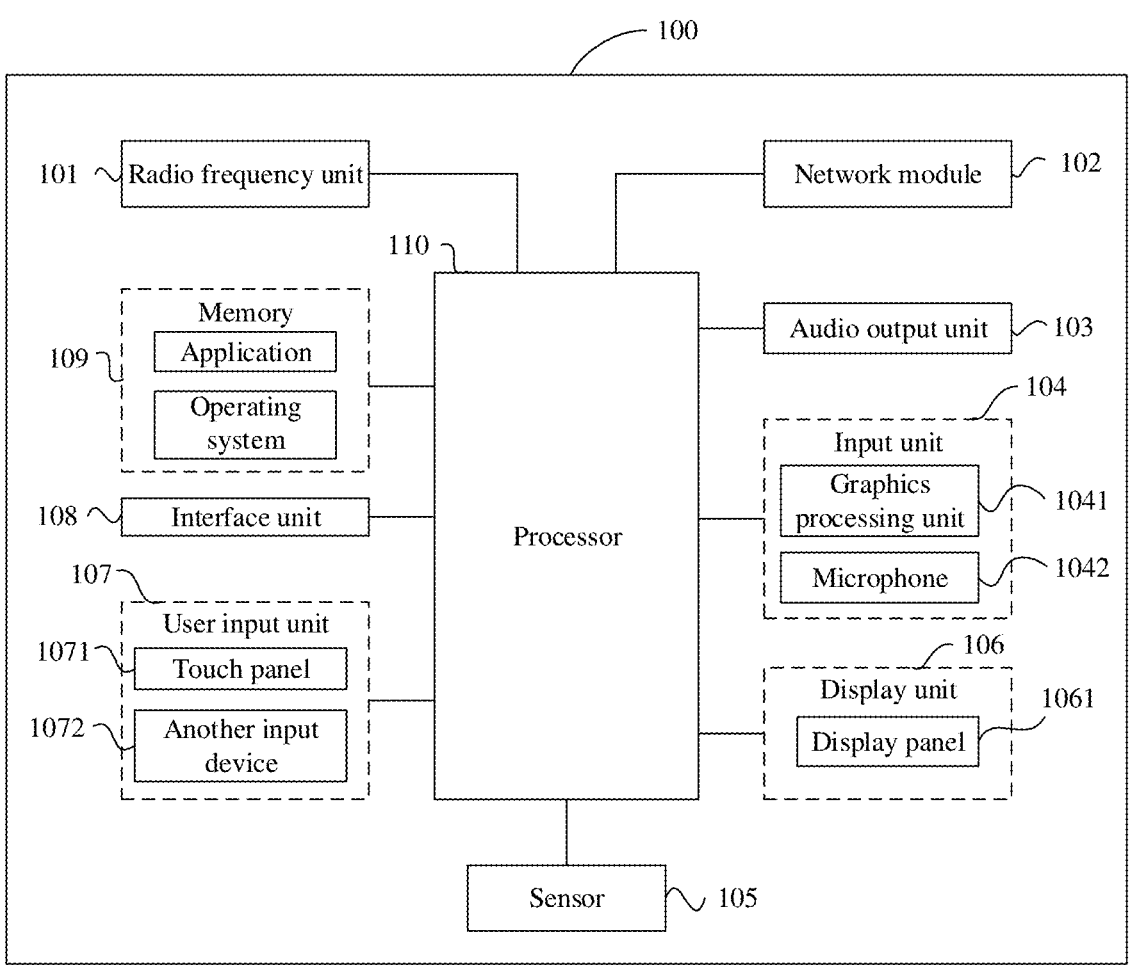
FIG. 11 is a second schematic diagram of a hardware structure of an electronic device according to an embodiment of this application.

FIG. 11 is a schematic diagram of a hardware structure of an electronic device according to an embodiment of this application.

An electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (such as a battery) that supplies power to each component. The power supply may be logically connected to the processor 110 by using a power supply management system, to implement functions such as charging and discharging management, and power consumption management by using the power supply management system. The structure of the electronic device shown in FIG. 11 does not constitute a limitation on the electronic device. The electronic device may include components more or fewer than those shown in the diagram, a combination of some components, or different component arrangements. Details are not described herein.

The user input unit 107 is configured to receive a first input performed by a user on a first interface, where the first interface includes at least one thumbnail, and each thumbnail is used to indicate one image.

The display unit 106 is configured to display N mode identifiers in response to the first input, where each mode identifier is used to indicate a photographing mode of at least one image, and N is a positive integer.

The user input unit 107 is further configured to receive a second input performed by a user on a target mode identifier in the N mode identifiers.

The display unit 106 is further configured to display a photographing preview interface of a target photographing mode in response to the second input, where the target photographing mode is a photographing mode indicated by the target mode identifier.

This embodiment of this application provides an electronic device. After a user performs a first input, the electronic device may display at least one mode identifier, to display a photographing mode corresponding to each image to the user, and the user may select a required photographing mode according to a use requirement, so that the electronic device displays a photographing preview interface of the photographing mode, and performs photographing based on the photographing mode, thereby implementing association between each photographing mode in an album application and a corresponding photographing mode in a camera application. Therefore, without manually exiting the album application and opening the camera application, the user may perform an operation in the camera application to rapidly invoke display of a photographing preview interface of a specific photographing mode, thereby reducing tedious operations performed by a user in a process of browsing an image in the album application and improving photographing efficiency.

Optionally, in this embodiment of this application, the user input unit 107 is specifically configured to receive the first input performed by a user on a target thumbnail in the at least one thumbnail. The display unit 106 is specifically configured to display the target mode identifier in a target region associated with the target thumbnail, where the target mode identifier is used to indicate a photographing mode of a target image indicated by the target thumbnail.

Optionally, in this embodiment of this application, the user input unit 107 is specifically configured to receive the second input performed by a user on M mode identifiers in the N mode identifiers. The display unit 106 is further configured to: before the photographing preview interface of the target photographing mode is displayed, display target photographing information of M photographing modes indicated by the M mode identifiers, where the target photographing information includes at least one of the following: a quantity of photographing times, a quantity of images photographed at intervals, and a photographing sequence; and the quantity of photographing times is a total quantity of photographing times of each photographing mode, the quantity of images photographed at intervals is a quantity of images photographed at an interval between two different photographing modes, and the photographing sequence is a photographing sequence of the M photographing modes indicated by the M mode identifiers, where M is a positive integer. The display unit 106 is specifically configured to sequentially display photographing preview interfaces of the M photographing modes according to the target photographing information.

Optionally, in this embodiment of this application, the user input unit 107 is further configured to: after the target photographing information of the M photographing modes indicated by the M mode identifiers is displayed, receive a third input performed by a user on the target photographing information. The processor 110 is configured to update the target photographing information of the M photographing modes in response to the third input. The display unit 106 is specifically configured to sequentially display the photographing preview interfaces of the M photographing modes according to the updated target photographing information.

Optionally, in this embodiment of this application, the display unit 106 is specifically configured to: display a photographing preview interface of an $i^{th}$ photographing mode according to the photographing sequence in the target photographing information, and start to perform image photographing; and display a photographing preview interface of an $(i+1)^{th}$ photographing mode in a case that a quantity of images photographed according to an $i^{th}$ quantity of photographing times in the $i^{th}$ photographing mode is equal to a quantity of images photographed at an i$^{th}$ interval, where i is a positive integer, and i≤M.

Optionally, in this embodiment of this application, the user input unit 107 is specifically configured to receive the first input performed by a user on a target control, where each mode identifier in the N mode identifiers corresponds to one folder, and each folder includes at least one image of a same photographing mode. The display unit 106 is specifically configured to update the first interface to a second interface, where the second interface includes N folders, the N mode identifiers, and a photographing control.

Optionally, in this embodiment of this application, the user input unit 107 is specifically configured to is specifically configured to receive the second input performed by a user on the target mode identifier in the N mode identifiers and the photographing control.

Optionally, in this embodiment of this application, the second input includes a first sub-input and a second sub-input, and the first sub-input is an input performed by a user on the target mode identifier in the N mode identifiers. The display unit 106 is further configured to: after the first interface is updated to the second interface, display T thumbnails and the photographing control in response to the first sub-input, where the T thumbnails are used to indicate T images in a folder corresponding to the target photographing mode, and T is a positive integer. The user input unit 107 is further configured to receive the second sub-input performed by a user on a target thumbnail in the T thumbnails and the photographing control. The display unit 106 is further configured to display the photographing preview interface of the target photographing mode of an image corresponding to the target thumbnail in response to the second sub-input.

The electronic device provided in this embodiment of this application can implement the processes implemented in the foregoing method embodiment, and can achieve a same technical effect. To avoid repetition, details are not described herein again.

For beneficial effects of the implementations in this embodiment, refer to the beneficial effects of the corresponding implementations in the foregoing method embodiment. To avoid repetition, details are not described herein again.

It should be understood that, in this embodiment of this application, the input unit 104 may include a graphics processing unit (Graphics Processing Unit GPU) 1041 and a microphone 1042, and the graphics processing unit 1041 processes image data of a still picture or a video obtained by an image capture apparatus (such as a camera) in a video capture mode or an image capture mode. The display unit 106 may include a display panel 1061. Optionally, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. An application processor and a modem processor may be integrated into the processor 110, the application processor mainly processes an operating system, a user interface, an application, and the like, and the modem processor mainly processes wireless communication. It can be understood that, alternatively, the modem processor may not be integrated into the processor 110.

An embodiment of this application further provides a non-transitory readable storage medium. The non-transitory readable storage medium stores a program or an instruction, and when the program or the instruction is executed by a processor, the processes of the foregoing method embodiment are implemented and a same technical effect can be achieved. To avoid repetition, details are not described herein again.

The processor is a processor in the electronic device in the foregoing embodiment. The non-transitory readable storage medium includes a non-transitory computer-readable storage medium, such as a computer read-only memory (Read-Only Memory, ROM), a random access memory (Random Access Memory, RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A photographing interface display method, wherein the method comprises:
  receiving a first input performed by a user on a first interface, wherein the first interface comprises at least one thumbnail, and each thumbnail indicates one image;
  displaying N mode identifiers in response to the first input, wherein each mode identifier is used to indicate a photographing mode of at least one image, and N is a positive integer;
  receiving a second input performed by a user on a target mode identifier in the N mode identifiers; and
  displaying a photographing preview interface of a target photographing mode in response to the second input, wherein the target photographing mode is a photographing mode indicated by the target mode identifier.

2. The method according to claim 1, wherein receiving a first input performed by a user on a first interface comprises:
  receiving the first input performed by a user on a target thumbnail in the at least one thumbnail; and
  displaying N mode identifiers comprises:
  displaying the target mode identifier in a target region associated with the target thumbnail, wherein the target mode identifier is used to indicate a photographing mode of a target image indicated by the target thumbnail.

3. The method according to claim 1, wherein receiving a second input performed by a user on a target mode identifier in the N mode identifiers comprises:
  receiving the second input performed by a user on M mode identifiers in the N mode identifiers; and
  before displaying a photographing preview interface of a target photographing mode, the method further comprises:
  displaying target photographing information of M photographing modes indicated by the M mode identifiers, wherein
  the target photographing information comprises at least one of the following: a quantity of photographing times, a quantity of images photographed at intervals, and a photographing sequence; and
  the quantity of photographing times is a total quantity of photographing times of each photographing mode, the quantity of images photographed at intervals is a quantity of images photographed at an interval between two different photographing modes, and the photographing sequence is a photographing sequence of the M photographing modes indicated by the M mode identifiers, wherein M is a positive integer; and
  displaying a photographing preview interface of a target photographing mode comprises:
  sequentially displaying photographing preview interfaces of the M photographing modes according to the target photographing information.

4. The method according to claim 3, wherein after displaying target photographing information of M photographing modes indicated by the M mode identifiers, the method further comprises:

receiving a third input performed by a user on the target photographing information; and
  updating the target photographing information of the M photographing modes in response to the third input; and
  sequentially displaying photographing preview interfaces of the M photographing modes according to the target photographing information comprises:
  sequentially displaying the photographing preview interfaces of the M photographing modes according to the updated target photographing information.

5. The method according to claim 4, wherein sequentially displaying the photographing preview interfaces of the M photographing modes according to the updated target photographing information comprises:
  displaying a photographing preview interface of an $i^{th}$ photographing mode according to the photographing sequence in the target photographing information, and starting to perform image photographing; and
  displaying a photographing preview interface of an $(i+1)^{th}$ photographing mode in a case that a quantity of images photographed according to an $i^{th}$ quantity of photographing times in the $i^{th}$ photographing mode is equal to a quantity of images photographed at an $i^{th}$ interval, wherein
  i is a positive integer, and $i \leq M$.

6. The method according to claim 1, wherein receiving a first input performed by a user on a first interface comprises:
  receiving the first input performed by a user on a target control, wherein
  each mode identifier in the N mode identifiers corresponds to one folder, and each folder comprises at least one image of a same photographing mode; and
  displaying N mode identifiers comprises:
  updating the first interface to a second interface, wherein the second interface comprises N folders, the N mode identifiers, and a photographing control.

7. The method according to claim 6, wherein receiving a second input performed by a user on a target mode identifier in the N mode identifiers comprises:
  receiving the second input performed by a user on the target mode identifier in the N mode identifiers and the photographing control.

8. The method according to claim 6, wherein the second input comprises a first sub-input and a second sub-input; and the first sub-input is an input performed by a user on the target mode identifier in the N mode identifiers; and after updating the first interface to a second interface, the method further comprises:
  displaying T thumbnails and the photographing control in response to the first sub-input, wherein the T thumbnails are used to indicate T images in a folder corresponding to the target photographing mode, and T is a positive integer; and
  receiving the second sub-input performed by a user on a target thumbnail in the T thumbnails and the photographing control; and
  displaying the photographing preview interface of the target photographing mode of an image corresponding to the target thumbnail in response to the second sub-input.

9. An electronic device, comprising a processor and a memory storing a program or an instruction that is capable of running on the processor, wherein the program or the instruction, when executed by the processor, causes the electronic device to perform:

receiving a first input performed by a user on a first interface, wherein the first interface comprises at least one thumbnail, and each thumbnail indicates one image;

displaying N mode identifiers in response to the first input, wherein each mode identifier is used to indicate a photographing mode of at least one image, and N is a positive integer;

receiving a second input performed by a user on a target mode identifier in the N mode identifiers; and displaying a photographing preview interface of a target photographing mode in response to the second input, wherein the target photographing mode is a photographing mode indicated by the target mode identifier.

10. The electronic device according to claim 9, wherein receiving a first input performed by a user on a first interface comprises:

receiving the first input performed by a user on a target thumbnail in the at least one thumbnail; and the displaying N mode identifiers comprises:

displaying the target mode identifier in a target region associated with the target thumbnail, wherein the target mode identifier is used to indicate a photographing mode of a target image indicated by the target thumbnail.

11. The electronic device according to claim 9, wherein receiving a second input performed by a user on a target mode identifier in the N mode identifiers comprises:

receiving the second input performed by a user on M mode identifiers in the N mode identifiers; and before displaying a photographing preview interface of a target photographing mode, the program or the instruction, when executed by the processor, causes the electronic device to further perform:

displaying target photographing information of M photographing modes indicated by the M mode identifiers, wherein the target photographing information comprises at least one of the following: a quantity of photographing times, a quantity of images photographed at intervals, and a photographing sequence; and the quantity of photographing times is a total quantity of photographing times of each photographing mode, the quantity of images photographed at intervals is a quantity of images photographed at an interval between two different photographing modes, and the photographing sequence is a photographing sequence of the M photographing modes indicated by the M mode identifiers, wherein M is a positive integer; and displaying a photographing preview interface of a target photographing mode comprises:

sequentially displaying photographing preview interfaces of the M photographing modes according to the target photographing information.

12. The electronic device according to claim 11, wherein after displaying target photographing information of M photographing modes indicated by the M mode identifiers, the program or the instruction, when executed by the processor, causes the electronic device to further perform:

receiving a third input performed by a user on the target photographing information; and updating the target photographing information of the M photographing modes in response to the third input; and sequentially displaying photographing preview interfaces of the M photographing modes according to the target photographing information comprises:

sequentially displaying the photographing preview interfaces of the M photographing modes according to the updated target photographing information.

13. The electronic device according to claim 12, wherein sequentially displaying the photographing preview interfaces of the M photographing modes according to the updated target photographing information comprises:

displaying a photographing preview interface of an $i^{th}$ photographing mode according to the photographing sequence in the target photographing information, and starting to perform image photographing; and displaying a photographing preview interface of an $(i+1)^{th}$ photographing mode in a case that a quantity of images photographed according to an $i^{th}$ quantity of photographing times in the $i^{th}$ photographing mode is equal to a quantity of images photographed at an $i^{th}$ interval, wherein i is a positive integer, and i≤M.

14. The electronic device according to claim 9, wherein receiving a first input performed by a user on a first interface comprises:

receiving the first input performed by a user on a target control, wherein each mode identifier in the N mode identifiers corresponds to one folder, and each folder comprises at least one image of a same photographing mode; and displaying N mode identifiers comprises:

updating the first interface to a second interface, wherein the second interface comprises N folders, the N mode identifiers, and a photographing control.

15. The electronic device according to claim 14, wherein receiving a second input performed by a user on a target mode identifier in the N mode identifiers comprises:

receiving the second input performed by a user on the target mode identifier in the N mode identifiers and the photographing control.

16. The electronic device according to claim 14, wherein the second input comprises a first sub-input and a second sub-input; and the first sub-input is an input performed by a user on the target mode identifier in the N mode identifiers; and after updating the first interface to a second interface, the program or the instruction, when executed by the processor, causes the electronic device to further perform:

displaying T thumbnails and the photographing control in response to the first sub-input, wherein the T thumbnails are used to indicate T images in a folder corresponding to the target photographing mode, and T is a positive integer; and receiving the second sub-input performed by a user on a target thumbnail in the T thumbnails and the photographing control; and displaying the photographing preview interface of the target photographing mode of an image corresponding to the target thumbnail in response to the second sub-input.

17. A non-transitory readable storage medium storing a program or an instruction, wherein the program or the instruction, when executed by a processor, causes the processor to perform:

receiving a first input performed by a user on a first interface, wherein the first interface comprises at least one thumbnail, and each thumbnail indicates one image;

displaying N mode identifiers in response to the first input, wherein each mode identifier is used to indicate a photographing mode of at least one image, and N is a positive integer;

receiving a second input performed by a user on a target mode identifier in the N mode identifiers; and displaying a photographing preview interface of a target photographing mode in response to the second input, wherein the target photographing mode is a photographing mode indicated by the target mode identifier.

18. The non-transitory readable storage medium according to claim 17, wherein receiving a first input performed by a user on a first interface comprises:

receiving the first input performed by a user on a target thumbnail in the at least one thumbnail; and displaying N mode identifiers comprises:

displaying the target mode identifier in a target region associated with the target thumbnail, wherein the target mode identifier is used to indicate a photographing mode of a target image indicated by the target thumbnail.

19. A chip, wherein the chip comprises a processor and a communication interface, the communication interface is coupled to the processor, and the processor is configured to run a program or an instruction to implement the photographing interface display method according to claim 1.

20. An electronic device, wherein the electronic device is configured to perform the photographing interface display method according to claim 1.

* * * * *